July 9, 1929.  O. BECKER  1,719,961
MAGAZINE CHANGE BOX FOR DAYLIGHT LOADING PLATE PACKS
Filed June 5, 1926   5 Sheets-Sheet 1
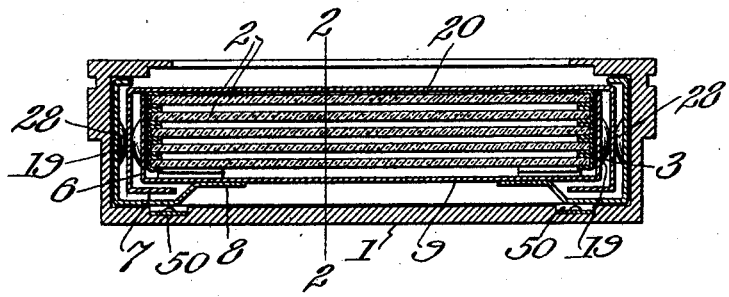
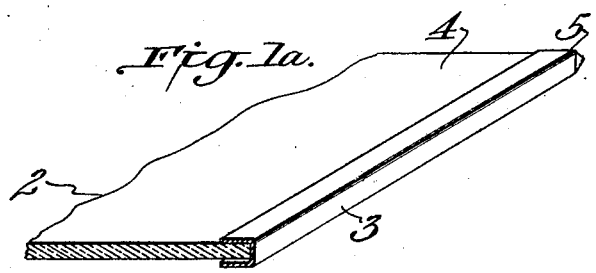
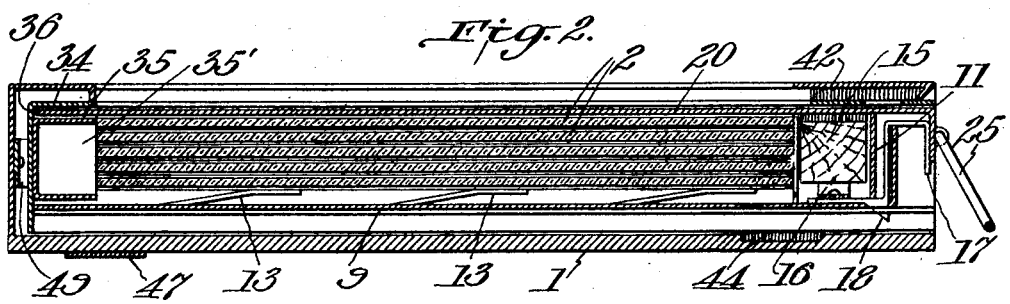
Inventor:
Oscar Becker,

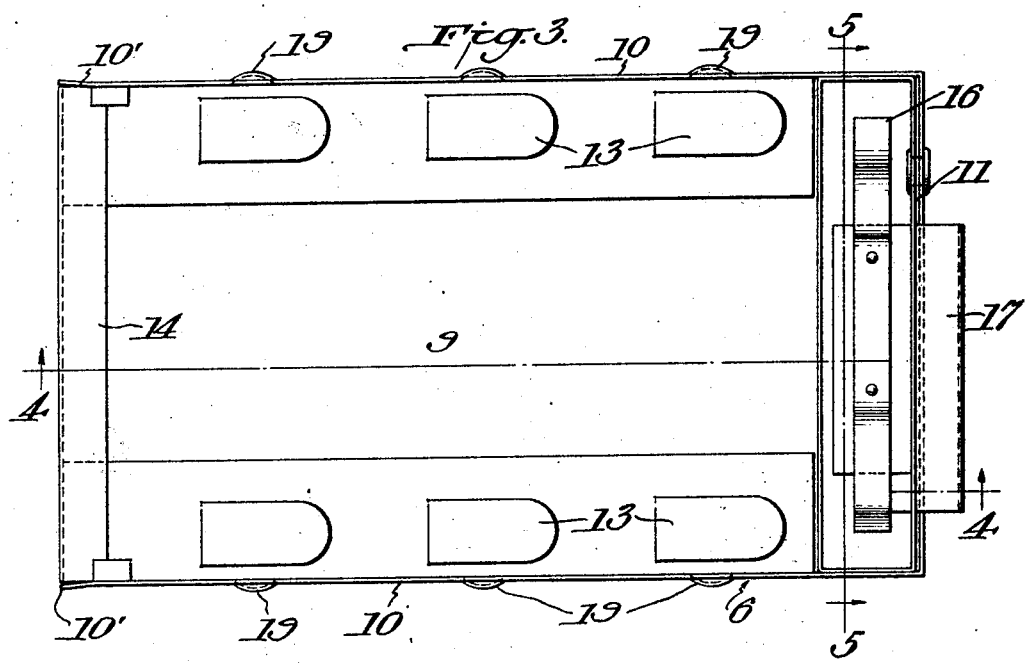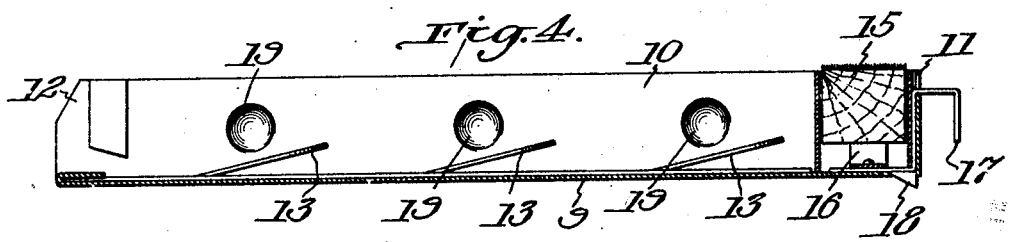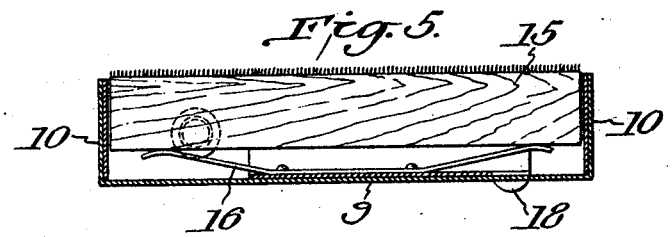

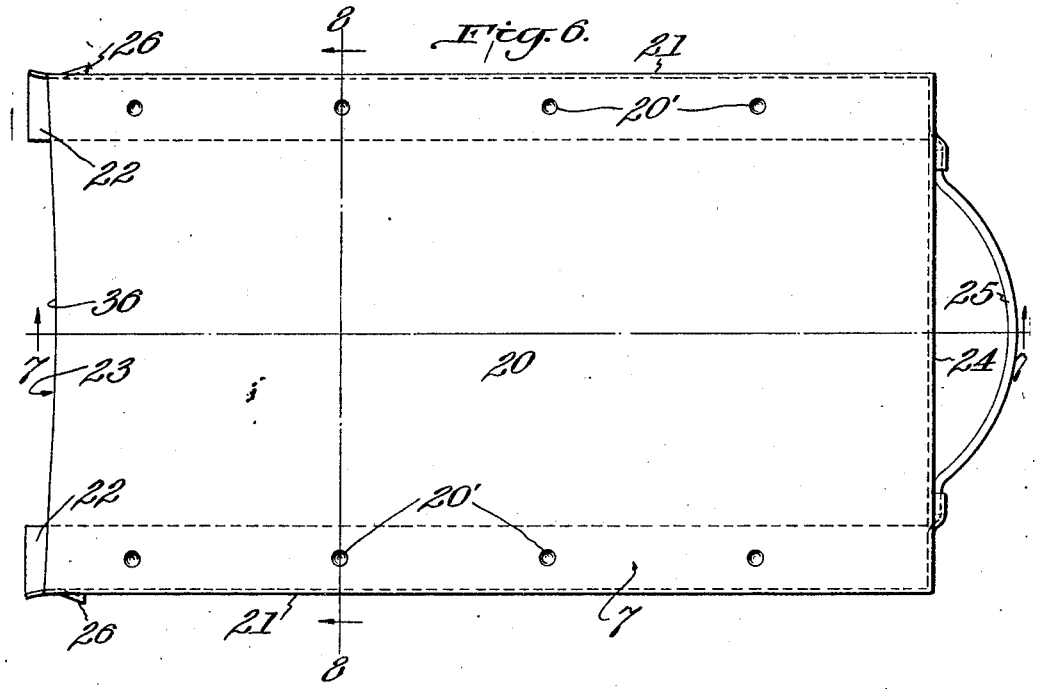
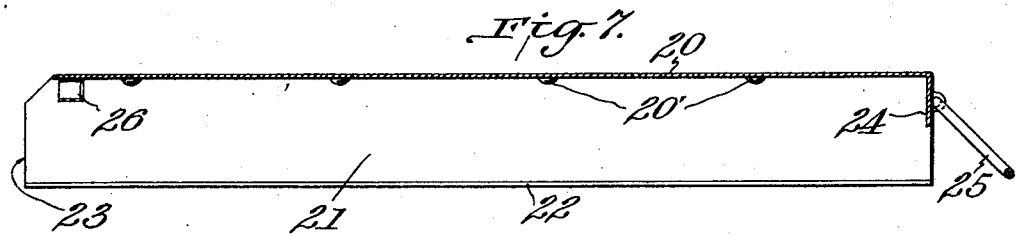
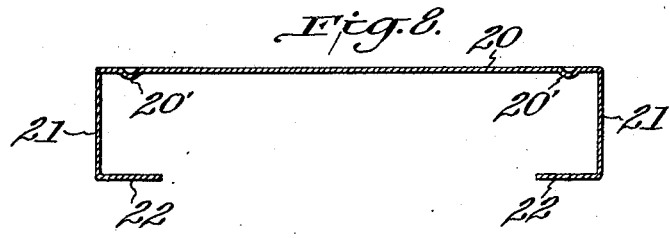

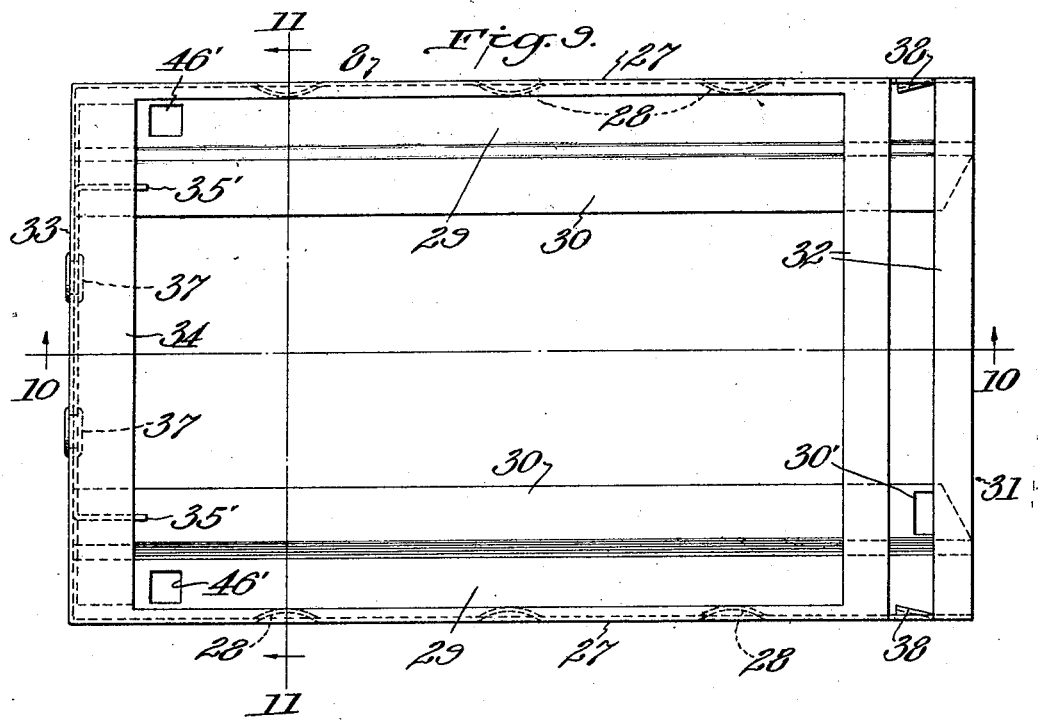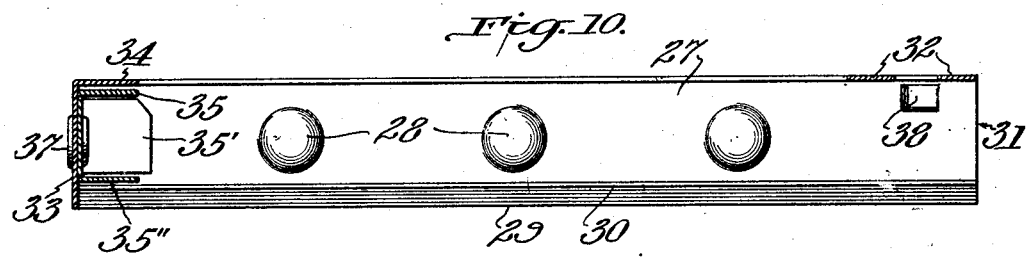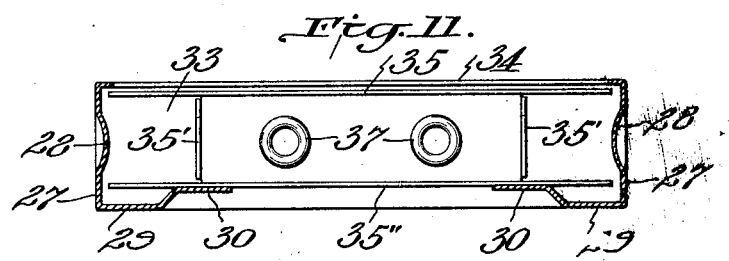

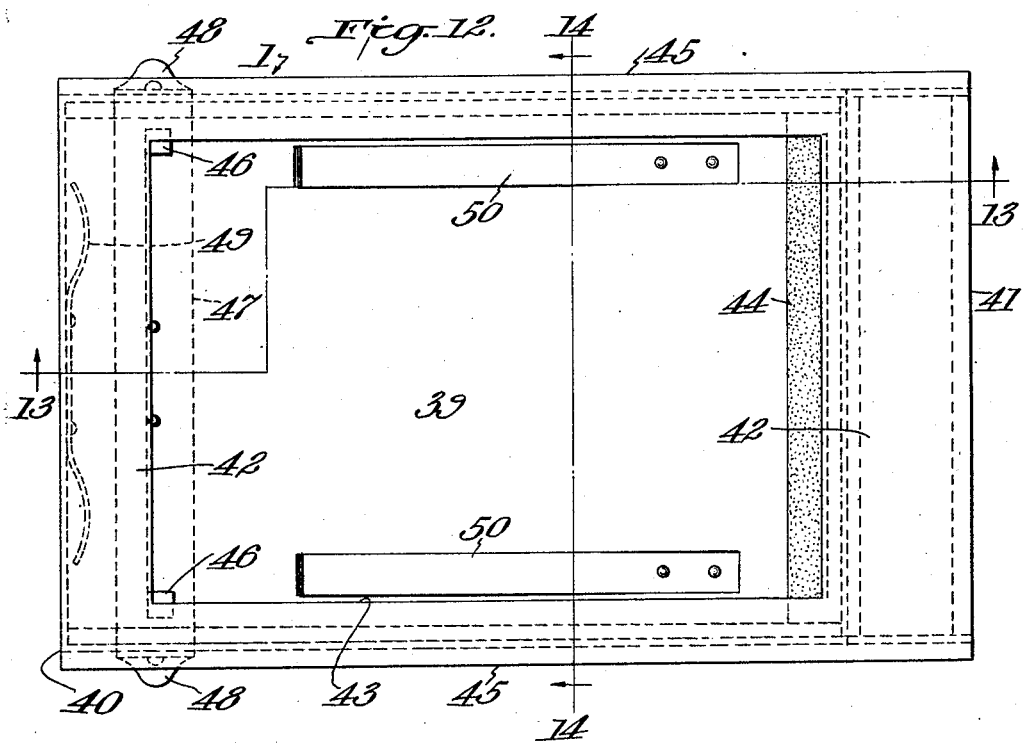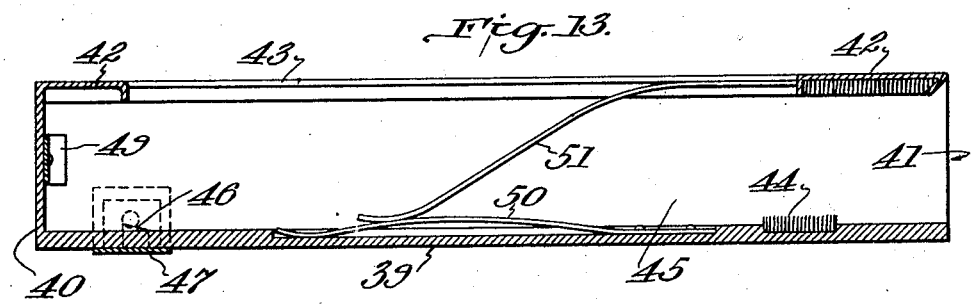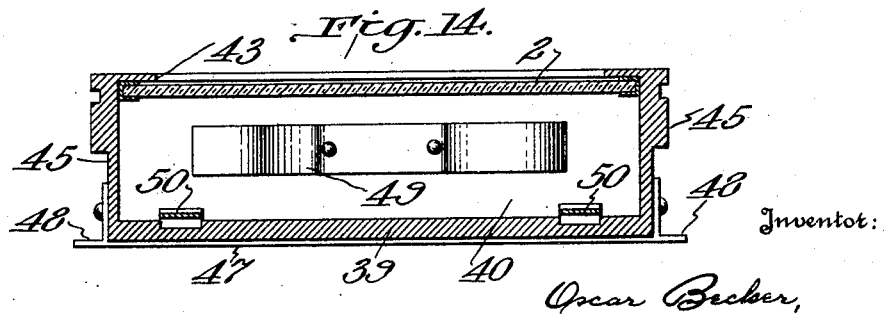

Patented July 9, 1929.

1,719,961

UNITED STATES PATENT OFFICE.

OSCAR BECKER, OF BERLIN-TREPTOW, GERMANY, ASSIGNOR, BY MESNE ASSIGNMENTS, TO AGFA ANSCO CORPORATION, OF BINGHAMTON, NEW YORK, A CORPORATION OF NEW YORK.

MAGAZINE CHANGE BOX FOR DAYLIGHT-LOADING PLATE PACKS.

Application filed June 5, 1926, Serial No. 113,936, and in Germany June 9, 1925.

Magazine change boxes in which the box containing the pile of plates is provided with a slide by means of which the plate to be temporarily exposed is brought into the exposure position are well-known.

Such change boxes, in which the plates after being placed in a dark room in separate containers or sheaths must be inserted in the box, are for this reason inconvenient to manipulate, and, if they are constructed with sufficient exactness, must have considerable dimensions and weight, which make them difficult to carry and unfavourably affects the stability of the camera with which they must be connected for the exposure. Also, the development of the pile of plates in the change box itself, which would simplify the process for amateurs and would render the use of a dark room unnecessary, is not possible with these known constructions, since the box, which has to be used repeatedly, would be injured by the various liquids employed in the development of the plates.

According to the present invention, the difficulties encountered in connection with change boxes with drawer and slide are obviated both as regards the weight and dimensions of the change box and its manipulation and the simultaneous development of the plates.

The essence of the invention lies in the fact that the removable drawer of the box provided with a slide for the plate to be exposed, is formed as a package in which the plates are sold, and after being used once, that is, after the exposure and development of the pile of plates, is thrown away, whilst the outer container for the reception of the box (the adapter) forms a part of the photographic apparatus, and is connected to it permanently or removably (according to the usual manner of connecting the change box with the photographic apparatus).

The difficulties of carrying out the above described arrangement consist among others in making the package that serves in connection with the adapter as a change box so stable that an exact exchange and an exact adjustment of the plate to be exposed can be obtained. Further, that the package, in spite of its stability, and the fact that it is made of sheet metal, is sufficiently light and of sufficiently small dimensions so that the adapter still fits in the usual groove of the apparatus in use. These difficulties are overcome according to the present invention by reason of the fact that the slide for closing light-tight the package is not, as formerly, guided in slots parallel to the upper surface of the plates, whereby the width of the package is very much increased, and the package cannot be used in connection with apparatus having the ordinary grooves, but the package serving as a daylight loading plate pack is formed of three sheet metal casings connected to one another so as to be lightproof, namely of two superposed sheet metal casings which surround one another lighttight longitudinally at right angles to the upper surfaces of the plates, and a third sheet metal member which forms a cap for closing light-tight the side of the package being open for changing the plates.

More particularly, the package serving as a withdrawable box is constructed of three light-tight relatively displaceable casings, namely the innermost part forming the base of the package in which the plates are placed and which consists beside the bottom of two side walls and a front wall, whilst it is open at its rear end; an intermediate member which serves as the cover or cover slide of the pile of plates enclosing with its side wall the side wall of the inner member and is likewise open at its rear end, and an outer casing of which the side walls also enclose the side walls of the intermediate casing, and which is closed at its rear end and open at its front end. Owing to the direct enclosure of the side walls of the inner casing by the side walls of the intermediate casing, which are for this purpose bent on their under surface, and of those of the intermediate casing by means of the side walls of the outer casing which also are bent for this purpose on their under surfaces, only a small space is required for the package, which in the direction of its width requires only a few millimetres more space than that corresponding to the width of the plates, whilst the plates are enclosed completely light-tight and at the same time the various parts of the box are guided reliably within one another, which is always necessary in the correct changing of the plates. At the same time the three members of which the package is formed are easily connected with one another and with the adapter so that either the whole package can be withdrawn from the adapter (in exchanging a used package for a new one), or the slide can be drawn out in order to bring a new plate into the exposure position, or the slide and the inner plate holder can be drawn out together from the outer member in order to place an exposed plate beneath the unexposed plates of the pile.

A further important feature in connection with the small dimensions of the package serving as an exchangeable daylight loading pack which allows of the development of the plates as a pile by immersing the package in a developing fluid, consists in the arrangement by which the plates are inserted in the package merely by means of edge strips which can be slid over their longitudinal edges instead of being provided with separate frames comprising ledges formed from the base. In this way it is possible while at the same time lessening the weight of the packing to keep the plates exactly parallel to one another in the pile, and also to ensure a uniform penetration of the developing liquid in the space between the surface of two plates.

One form of construction of the invention is illustrated by way of example in the accompanying drawings in which:

Fig. 1 is a cross-section of the package and the adapter.

Fig. 1ª is a perspective view of a plate held in the side strips.

Fig. 2 is a longitudinal section on line 2—2 of Fig. 1.

Fig. 3 is a plan.

Fig. 4 is a longitudinal section on line 4—4 of Fig. 3, and

Fig. 5 is a cross-section on line 5—5 of Fig. 3 of the inner casing of the box serving also as the package.

Fig. 6 is a plan.

Fig. 7 is a longitudinal section on line 7—7 of Fig. 6, and

Fig. 8 is a cross-section on line 8—8 of Fig. 6 of the intermediate member of the box.

Fig. 9 is a plan.

Fig. 10 is a longitudinal section on line 10—10 of Fig. 9, and

Fig. 11 is a cross section on line 11—11 of Fig. 9 of the outer member of the package.

Fig. 12 is a plan.

Fig. 13 is a longitudinal section on line 13—13 of Fig. 12, and

Fig. 14 is a cross-section on line 14—14 of Fig. 12 of the adapter forming part of the apparatus.

Referring to Figs. 1 and 2, 1 is the adapter in which can be inserted the box that serves as a package and contains the plates 2.

The latter are not, as formerly, inserted in separate box-shaped frames provided with bottom surfaces, but small U-shaped strips 3 are inserted around their side edges so that the plates are spaced apart exactly at the same distance and parallel to one another. One of these edge strips is shown on an enlarged scale in perspective in Fig. 1ª. It extends over the front edge 4 of a plate, and the extended end 5 is believed to facilitate the covering of the exposed plate by the slide, and the guiding of the plate during changing. The box that serves as a package for the plates 2 consists of three relatively displaceable casings 6, 7 and 8, namely the inner member 6 forming the base of the package, the member 7 forming the cover and slide for the package and the outer part 8.

The inner portion 6 consists as shown in Figs. 3–5 of a sheet metal portion with a base piece 9 and side walls 10, as well as a front end wall 11, whilst it is open at its rear end 12. Near the side walls 10, leaf springs 13 are secured to or stamped out from the base 9 and are connected to the base by a rear cover strip 14 and serve to press upwards the plates 2 laid directly upon these leaf springs.

For ensuring a light-tight closure between the inner portion 6 and intermediate portion 7, an end member 15, made of wood and covered with velvet, is inserted at the front wall 11 and is pressed upward by a leaf spring 16. Between the member 15 and the front wall 11 a projection 18 having a projecting handle 17 is displaceably arranged, the said projection passing through a slot in the base 9. The projection 18 may also serve directly as a support for the spring 16.

The side walls 10 of the inner member 6 are bent outwardly at their lower open ends 10′ (Fig. 3), in order to provide a funnel-shaped entrance for the plate to be changed. They are also provided with bosses 19 which serve as guides for the surrounding side walls of the intermediate portion 7.

The latter is illustrated in Figs. 6–8. It consists of a cover plate 20 with side walls 21 which have rectangularly bent portions 22 at the lower surfaces. The casing is open at its rear end 23, whilst at its front end it is provided with a small strip 24 to which is secured a handle 25. The distance apart of the side walls 21 of the intermediate member 7 corresponds to the distance between the side walls 10 of the inner member 6 or the bosses 19, so that if the intermediate member 7 is pushed over the inner member 6 the side walls 10 of the latter are enclosed by the side walls 21.

At the rear end of the side walls 21 are secured outward catches 26, which co-operate with notches of the outer member 8, so that the intermediate member, which serves as a cover and a slide cannot be completely withdrawn from the box. On the longitudinal sides of the cover portion 20 the intermediate portion 7 carries a row of pressed in bosses 20′, which, during development, hold the uppermost plate at the same distance from the cover as the remaining plates are from one another.

The outer member 8, which is shown in

Figs. 9–11, has side walls 27 with inwardly pressed projections 28, whose distance apart corresponds to that of the side walls 21 of the intermediate member 7, so that these walls can be guided tightly and yet easily within the side walls 27 of the outer member. These side walls 27 are provided on their under surfaces with bent edges 29 which lie with their outer part under the bent edges 22 of the intermediate member 7, and which lie with their inner slightly bent inwards portion 30 directly under the base of the inner member. Thus the relatively displaceable members of the package are guided perfectly light proof with the smallest width dimensions.

The outer member 8 is open at its front end 31. The side walls are stiffened by upper cross members 32. At its rear end is a closed wall 33 having on its upper edge a bent over cross strip 34, beneath which at a small distance from and parallel to it is a cross strip 35 by means of which the front edge 36 of the cover member 20 of the intermediate portion 7 can be forced into position into the space between the cross strips 34 and 35, so that the upper rear edge of the package is completely enclosed light-tight. Beneath the cross strip 35 are two projections 35' (Figs. 9 and 10) along the front edges of which the exposed plate is guided. Beneath these projections there is a transverse strip 35'' parallel to the strip 35, which when the rear end of the base 9 is pushed in lies above the latter and ensures a light-tight closure of the lower rear edge of the package. Openings 37 are provided in the end wall 33 which can be made light-tight by pasting strips over them or by making them in labyrinth form and through which a liquid can penetrate, so that after removal of the strips the openings are free and the enclosed package, after the plates have been exposed, can be immersed directly in the developer which enters through the openings in the packing and rises between the plates, which are in this way developed. At the front end of the side walls 27 of the outer member 8 stamped out notches 38 are provided, which co-operate with the catches 26 of the side walls 21 of the intermediate member 7, so that the latter cannot be completely withdrawn from the outer casing. Also, a recess 30' is provided in the bent strip 30 of one of the side walls 27 of the outer member 8 into which recess the projection 18 (see Fig. 4) can enter, so that the outer and inner members are rigidly secured to one another, and the inner member 6 together with the intermediate member 7 can only be removed from the outer member 8 after the projection 18 has been disengaged from the recess of the strip 30 by raising the handle 17.

The adapter 1 (Figs. 1 and 2), which may be detachably or permanently secured to the photographic apparatus, consists as shown in Figs. 12, 13 and 14 of a prismatic casing with a base 39 and is closed at its rear end by a wall 40, whilst its front end 41 is open for the passage of the package which serves as a daylight loading pack. The upper covering wall 42 of the casing is provided with an opening or window 43 corresponding to the surface of the plates to be exposed. Strips of velvet 44 ensure a light-tight closure between the adapter and the package. Side walls 45 complete the adapter. The package is secured in the adapter by projections 46 inserted through openings in the under surface of the adapter, and engaging with corresponding notches 46' in the under side of the outer member 8 of the package. These projections are arranged on a leaf spring 47, and, when the package is to be removed from the adapter, can be freed from the notches in the package by a laterally projecting handle 48 which is secured to the leaf spring 47. In this case a leaf spring 49, secured to the inner side of the wall 40, presses the package forwards, so that it can conveniently be gripped by the hand and removed through the opening 41. To the inner side of the base 39 of the adapter are secured further leaf springs 50, which press the box against the exposure window, whilst leaf springs 51 secured to the cover 42 of the adapter bear against the uppermost plate which has been exposed, when the drawer is in position, and press this plate downward, when the plates are to be changed, that is, when the inner member is withdrawn with the pile of plates, so that, when the inner member is inserted, it bears against the lowest part of the pile of plates.

When the plates are to be developed, after they have all been exposed, the box serving as the package is removed from the adapter, the openings 37 for the developing liquid are uncovered by tearing off the covering strips, and the package is immersed in the liquid, which penetrates through the openings in the package, and rises between the plates, after which the developed plates can be fixed in a similar way while still in a pile.

Having now particularly described and ascertained the nature of my said invention and in what manner the same is to be performed, I declare that what I claim is:—

1. A package adapted to contain photographic plates comprising a drawer consisting of an inner casing and an intermediate casing slidably displaceable and a cover enclosing said inner casing and said intermediate casing, said cover and casings being arranged in light-tight engagement.

2. The structure as in claim 1 wherein said inner casing and said intermediate casing constitute a container having an open end.

3. The structure as in claim 1 wherein said inner casing and said intermediate casing constitute a container having an open end and said cover has an end which forms a light-tight closure for said open end.

4. In a magazine change box for cameras, the combination with an adapter, of a removable drawer forming a package for the plates and provided with a slide covering and separating the plate to be exposed, the said drawer comprising an inner and an intermediate casing which are relatively displaceable and which surround one another light-tight on their longitudinal edges, and a third outer casing which closes light-tight the open transversal side of the inner casings.

5. In a magazine change box for cameras, the combination with an adapter, of a removable drawer forming a package for the plates, the said drawer comprising an inner and an intermediate casing which are relatively displaceable and which surround one another light-tight on their longitudinal edges, the longitudinal walls of the intermediate casing being bent around the corresponding walls of the inner casing, and a third outer sheet metal casing which closes light-tight the open transversal side of the two inner casings.

6. In a magazine change box for cameras, the combination with an adapter, of a removable drawer forming a package for the plates and provided with a slide covering and separating the plate to be exposed, the said drawer comprising an inner and an intermediate casing which are relatively displaceable and which surround one another light-tight on their longitudinal edges, the longitudinal walls of the intermediate casing being bent around the corresponding walls of the inner casing, and a third outer casing which closes light-tight the open transversal side of the two inner casings, this third casing also being provided with side walls which enclose externally the intermediate casing.

7. In a magazine change box for cameras, the combination with an adapter, of a removable drawer forming a package for the plates and provided with a slide covering and separating the plate to be exposed, the said drawer comprising an inner and an intermediate casing which are relatively displaceable and which surround one another light-tight on their longitudinal edges, the longitudinal walls of the intermediate casing being bent around the corresponding walls of the inner casing so that the bent strips lie under the base of the inner casing, and a third outer casing which closes light-tight the open transversal side of the two inner casings, this third casing also being provided with side walls which enclose externally the intermediate casing, and which side walls are also bent at their lower edges, so that their bent strips lie with their outer bent portion under the bent strips of the intermediate casing and with their inner bent portion under the base portion of the inner casing.

8. In a magazine change box for cameras, the combination with an adapter, of a removable drawer forming a package for the plates and provided with a slide covering and separating the plate to be exposed, the said drawer comprising an inner and an intermediate casing which are relatively displaceable and which surround one another light-tight on their longitudinal edges, the side walls of the inner casing being provided with bosses formed by pressing out the walls, the side walls of the intermediate casing being bent at their lower edges, so that the bent strips lie under the base of the inner casing, and a third outer casing which closes light-tight the open transversal side of the two inner casings, the third casing also being provided with side walls which enclose externally the intermediate casing, and which side walls are provided with recesses formed by pressing said walls inwardly and are also bent at their lower edges, so that their bent strips lie with their outer bent portion under the bent strips of the intermediate casing and with their inner bent portion under the base portion of the inner casing.

9. In a magazine change box for cameras, the combination with an adapter, of a removable drawer forming a package for the plates, the said drawer comprising an inner and an intermediate sheet metal casing which are relatively displaceable and which surround one another light-tight on their longitudinal edges, the side walls of the inner casing being provided with bosses formed by pressing out the walls, the side walls of the intermediate casing being bent at their lower edges to ensure the light-tight closure of the side walls of the inner member, so that the bent strips lie under the base of the inner casing, and a third outer sheet metal casing which closes light tight the open transversal side of the two inner casings, the third casing also being provided with side walls which enclose externally the intermediate casing, and which side walls are provided with recesses formed by pressing said walls inwardly and are also bent at their lower edges, so that their bent strips lie with their outer bent portion under the bent strips of the intermediate casing and with their inner bent portion under the base portion of the inner casing, the inner casing being connected to the outer casing by means of a catch and being provided with a handle projecting from its front surface, so that the inner casing with the cover slide can be removed, after engagement of the catch, from the outer casing for the purpose of changing a plate.

10. In a magazine box for cameras, the combination with an adapter, of a removable drawer forming a package for the plates and provided with a slide covering and separating the plate to be exposed, the said drawer comprising an inner and an intermediate casing which are relatively displaceable and which surround one another light-tight on their longitudinal edges, the side walls of the inner casing being provided with bosses formed by pressing out the walls, the side walls of the intermediate casing being bent at their lower edges to ensure the light-tight closure of the side walls of the inner member, so that the bent strips lie under the base of the inner casing, and a third outer sheet metal casing which closes light-tight the open transversal side of the two inner casings, the third casing also being provided with side walls which enclose externally the intermediate casing and which side walls are provided with recesses formed by pressing said walls inwardly and are also bent at their lower edges, so that their bent strips lie with their outer bent portion under the bent strips of the intermediate casing and with their inner bent portion under the base portion of the inner casing, the intermediate casing being provided with projections at the rear ends of its side walls which cooperate, when the intermediate casing is being drawn out, with notches pressed in from the side walls of the outer casing, the inner casing being connected to the outer casing by means of a catch and being provided with a handle projecting from its front surface, so that the inner casing with the cover slide can be removed, after engagement of the catch, from the outer casing for the purpose of changing a plate.

11. In a magazine change box for cameras, the combination with an adapter, of a removable drawer forming a package for the plates and provided with a slide covering and separating the plate to be exposed, the said drawer comprising an inner and an intermediate sheet metal casing which are relatively displaceable and which surround one another light-tight on their longitudinal edges, the side walls of the inner casing being provided with bosses formed by pressing out the walls, the side walls of the intermediate casing being bent at their lower edges to ensure the light-tight closure of the side walls of the inner member, so that the bent strips lie under the base of the inner casing, and a third outer casing which closes light-tight the open transversal side of the two inner casings, the third casing also being provided with side walls which enclose externally the intermediate casing serving as a slide at right angles to the upper surfaces of the plates, and which side walls are provided with recesses formed by pressing said walls inwardly and are also bent at their lower edges, so that their bent strips lie with their outer bent portion under the bent strips of the intermediate casing and with their inner bent portion under the base portion of the inner casing, the intermediate casing being provided with projections at the rear ends of its side walls which cooperate, when the intermediate casing is being drawn out, with notches pressed in from the side walls of the outer casing, and the covering surface of the intermediate casing having near its longitudinal edges bosses projecting towards the interior and pressing against the upmost plate, the inner casing being connected to the outer casing by means of a catch and being provided with a handle projecting from its front surface, so that the inner casing with the cover slide can be removed, after engagement of the catch, from the outer casing for the purpose of changing a plate.

12. In a magazine change box for cameras, the combination with an adapter, of a removable drawer forming a package for the plates and provided with a slide covering and separating the plate to be exposed, the said drawer comprising an inner and an intermediate casing which are relatively displaceable and which surround one another light-tight on their longitudinal edges, the side walls of the inner casing being provided with bosses formed by pressing out the walls, the side walls of the intermediate casing being bent at their lower edges to ensure the light-tight closure of the side walls of the inner member, so that the bent strips lie under the base of the inner casing, and a third outer casing which closes light-tight the open transversal side of the two inner casings, the third casing also being provided with side walls which enclose externally the intermediate casing serving as a slide at right angles to the upper surfaces of the plates, and which side walls are provided with recesses formed by pressing said walls inwardly and are also bent at their lower edges, so that their bent strips lie with their outer bent portion under the bent strips of the intermediate casing and with their inner bent portion under the base portion of the inner casing, the outer casing having in its wall openings, closed light-tight, at suitable positions, in order that the plates may be developed and fixed in the removable drawer, the intermediate casing being provided with projections at the rear ends of its side walls which cooperate, when the intermediate casing is being drawn out, with notches pressed in from the side walls of the outer casing, and the covering surface of the intermediate casing having near its longitudinal edges bosses projecting towards the interior and pressing against the upmost plate, the inner casing being connected to the outer casing by means of a catch and being provided with a handle projecting from its front surface, so that the inner casing with the cover slide can be removed, after engagement of the catch, from the outer casing for the purpose of changing a plate.

13. In a magazine change box for cameras, the combination with an adapter, of a removable drawer forming a package for the plates and provided with a slide covering and separating the plate to be exposed, the plates being bordered along their longitudinal edges by side strips and being readily formed into a pile, the said drawer comprising an inner and an intermediate casing which are relatively displaceable and which surround one another light-tight on their longitudinal edges, the side walls of the inner casing being provided with bosses formed by pressing out the walls, the side walls of the intermediate casing being bent at their lower edges to ensure the light-tight closure of the side walls of the inner member, so that the bent strips lie under the base of the inner casing, and a third outer casing which closes light-tight the open transversal side of the two inner casings, the third casing also being provided with side walls which enclose externally the intermediate casing serving as a slide at right angles to the upper surfaces of the plates, and which side walls are provided with recesses formed by pressing said walls inwardly and are also bent at their lower edges, so that their bent strips lie with their outer bent portion under the bent strips of the intermediate casing and with their inner bent portion under the base portion of the inner casing, the outer casing having in its wall openings, closed light-tight, at suitable positions, in order that the plates may be developed and fixed in the removable drawer, the intermediate casing being provided with projections at the rear ends of its walls which cooperate, when the intermediate casing is being drawn out, with notches pressed from the side walls of the outer casing, and the covering surface of the intermediate casing having near its longitudinal edges bosses projecting towards the interior and pressing against the bordering side strips of the upmost plate, the inner casing being connected to the outer casing by means of a catch and being provided with a handle projecting from its front surface, so that the inner casing with the cover slide can be removed, after engagement of the catch, from the outer casing for the purpose of changing a plate.

14. In a magazine change box for cameras, the combination with an adapter permanently mounted in the cameras and having spring actuated catches passing through openings therein, of a drawer adapted to contain photographic plates for slidable insertion in said adapter, said drawer having openings therein to receive said catches the adapter being provided with spring means urging said drawer forwardly out of said adapter when said catches are released.

In testimony whereof I affix my signature.

OSCAR BECKER.